United States Patent
Lu et al.

(10) Patent No.: US 7,411,356 B2
(45) Date of Patent: Aug. 12, 2008

(54) POWER SUPPLY FOR MULTIPLE DISCHARGE LAMPS AND THE CURRENT BALANCE DEVICE THEREOF

(75) Inventors: Zengyi Lu, Shanghai (CN); Wei Chen, Shanghai (CN); Dengyan Zhou, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/537,300

(22) Filed: Sep. 29, 2006

(65) Prior Publication Data

US 2007/0241687 A1   Oct. 18, 2007

(30) Foreign Application Priority Data

Apr. 17, 2006   (TW) ............................... 95113702 A

(51) Int. Cl.
*H05B 41/16*   (2006.01)
*H05B 37/00*   (2006.01)

(52) U.S. Cl. ..................................... 315/276; 315/312

(58) Field of Classification Search ................. 315/274, 315/276, 312, 291, 307, DIG. 2, 4
See application file for complete search history.

(56) References Cited

U.S. PATENT DOCUMENTS

| | | | | |
|---|---|---|---|---|
| 4,123,690 A * | 10/1978 | Osteen | ......................... | 315/258 |
| 4,574,222 A * | 3/1986 | Anderson | .................... | 315/254 |
| 4,902,942 A * | 2/1990 | El-Hamamsy | ............... | 315/276 |
| 5,036,255 A * | 7/1991 | McKnight et al. | ........... | 315/258 |
| 7,034,647 B2 * | 4/2006 | Yan et al. | ..................... | 336/212 |
| 2007/0007909 A1 * | 1/2007 | Kim et al. | .................... | 315/282 |

* cited by examiner

Primary Examiner—Douglas W. Owens
Assistant Examiner—Minh Dieu

(57) ABSTRACT

A power supply for discharge lamp includes a transformer and a current balance device, wherein the transformer includes a primary winding and a secondary winding and the current balance device is coupled between the secondary winding and a plurality of discharge lamps. The current balance device may include a single inductor wherein at least two windings are connected in series with each other and each serially-connected winding is coupled with a discharge lamp, and the other windings are respectively coupled with a discharge lamp. The current balance device may include two inductors wherein at least one winding of a first inductor is connected in series with at least one winding of a second inductor and each serially-connected winding is coupled with a discharge lamp, and the other windings of the first inductor and the other windings of the second inductor are respectively coupled with a discharge lamp.

16 Claims, 4 Drawing Sheets

POWER SUPPLY FOR MULTIPLE DISCHARGE LAMPS AND THE CURRENT BALANCE DEVICE THEREOF

FIELD OF THE INVENTION

The present invention is related to a current balance device for multiple discharge lamps, and more particularly to a power supply for driving multiple discharge lamps with a current balance device for equating the currents flowing through the discharge lamps.

BACKGROUND OF THE INVENTION

Cold cathode fluorescent lamp (CCFL) is a discharge lamp served in the backlight module of a LCD display panel as a light-emitting unit for the LCD display panel. Generally, the fluorescent lamp are driven by a high-voltage inverter which provides a high-frequency AC voltage to the fluorescent lamp and includes feedback control loops to regulate lamp currents. In a typical LCD display panel, multiple fluorescent lamps are generally required to provide sufficient backlighting for the LCD display panel.

In the application of multiple discharge lamps, the impedance of each discharge lamp is different with one another. Therefore, the current flowing in each discharge lamp is also different with one another. This would not only cause the brightness of the LCD display to become non-uniform, but also shorten the lifetime of the discharge lamp. Eventually, the entire LCD display panel would be damaged.

In order to solve the problem as a result of the current unbalance between discharge lamps, several current balance technique for discharge lamps have been presented to remove this deficiency. As shown in FIG. 1, a primary winding Np1 of a transformer T1 and a primary winding Np2 of a transformer T2 are connected in series with each other, and a secondary winding Ns1 of a transformer T1 and a secondary winding Ns2 of the transformer T2 are respectively coupled with a discharge lamp LP1, LP2. An input DC voltage is converted into a high-frequency AC voltage Vin by a switch device (not shown) and the generated AC voltage Vin is coupled to the primary windings Np1 and Np2. By the transformers T1 and T2, the AC voltage Vin is boosted to a desired AC voltage to drive discharge lamps LP1 and LP2. Because the primary windings Np1 and Np2 both have the same turn number and are connected in series with each other and the turn ratio between the secondary winding Ns1 and the secondary winding Ns2 is 1:1, the currents flowing through the discharge lamps LP1 and LP2 can be balanced. In this case, each primary winding Np1, Np2 will receive a smaller voltage due to the serial connection between the primary winding Np1 and Np2. In order to enable the secondary windings Ns1 and Ns2 to induce an AC voltage of the same voltage level, the turn number of the secondary winding Ns1 and the turn number of the secondary winding Ns2 have to increase. This would disfavor the miniaturization of the inverter and increase the power loss generated in the inverter.

FIG. 2 shows the topology of another conventional power supply for multiple discharge lamps. As shown in FIG. 2, an input DC voltage is converted into a high-frequency AC voltage Vin by a switch device (not shown). The high-frequency AC voltage Vin is coupled to a primary winding Np of a transformer T1 and thus a high-frequency AC voltage is induced across a secondary winding Ns for driving discharge lamps LP1-LP3. The discharge lamps LP1-LP3 are coupled to the secondary winding Ns of the transformer T1 and each discharge lamp LP1, LP2, Lp3 is respectively connected to a choke coil W1, W2, W3. The first windings of the choke coils W1, W2, W3 are coupled with each other and the second windings of the choke coils W1, W2, W3 are coupled with each other. The turn ratio between the first windings of the choke coils W1-W3 is 1:1:1, and the turn ratio between the second windings of the choke coils W1-W3 is also 1:1:1. In this manner, the currents flowing through the discharge lamps LP1-LP3 can be balanced. However, each discharge lamp of FIG. 2 requires a choke coil to be connected therewith. This would increase the number of magnetic elements for use in the inverter and aggrandize the size and cost of the inverter.

FIG. 3 shows the topology of another conventional power supply for multiple discharge lamps, in which a current balance device using common-mode chokes for balancing the currents flowing through the discharge lamps is provided. In FIG. 3, an input AC voltage Vin is coupled to a primary winding Np of a transformer T1 and a boosted high-frequency AC voltage is induced across a secondary winding Ns of the transformer T1 for driving discharge lamps LP1-LP3. A common-mode choke CC1 is coupled with adjacent discharge lamps LP1 and LP2 and a common-mode choke CC2 is coupled with adjacent discharge lamps LP3 and LP2, in which the second winding of the common-mode choke CC1 is connected in series with the first winding of the common-mode choke CC2. With the connection between the common-mode choke CC1 and the common-mode choke CC2, the currents flowing through the discharge lamps LP1-LP3 can be balanced. However, the circuitry of FIG. 3 needs numerous inductive elements, which would increase the number of magnetic elements for use in the inverter and aggrandize the size and cost of the inverter.

There is a need to design a power supply for multiple discharge lamps and the current balance device used in the power supply which is configured to achieve current balance for multiple discharge lamps with a minimum number of magnetic elements and an optimized driving capability for multiple discharge lamps.

SUMMARY OF THE INVENTION

An object of the present invention is to provide a current balance device for balancing the currents flowing through multiple discharge lamps.

Another object of the present invention is to provide a power supply for driving multiple discharge lamps, in which a current balance device is provided to balance the currents flowing through the discharge lamps.

According to a narrower aspect of the present invention, a current balance device is provided and coupled between a secondary side of a transformer and multiple discharge lamps. The current balance device includes an inductor having a magnetic core with a plurality of legs and a plurality of windings each of which is would on a leg, wherein at least two of the plurality of windings are connected in series with each other and each serially-connected winding is coupled to a discharge lamp, and the other windings are respectively coupled to a discharge lamp.

According to another narrower aspect of the present invention, a current balance device is provided and coupled between a secondary side of a transformer and multiple discharge lamps. The current balance device includes a first inductor having a magnetic core with a plurality of legs and a plurality of windings each of which is wound on a leg, and a second inductor having a magnetic core with a plurality of legs and a plurality of windings each of which is wound on a leg. At least one winding of the first inductor and at least one winding of the second inductor are connected in series with each other and each serially-connected winding is coupled to a discharge lamp, and the other windings of the first inductor and the other windings of the second inductor are respectively coupled to a discharge lamp.

According to a broader aspect of the present invention, a power supply for multiple discharge lamps is provided, including a transformer having a primary winding and a secondary winding and configured to receive an input voltage through the primary winding and induce an output voltage across the secondary winding, and a current balance device coupled between the secondary winding and multiple discharge lamps for balancing the currents flowing through the discharge lamps. The current balance device includes an inductor having a magnetic core with a plurality of legs and a plurality of windings each of which is wound on a leg, wherein at least two of the plurality of windings are connected in series with each other and each serially-connected winding is coupled to a discharge lamp, and the other windings are respectively coupled to a discharge lamp.

According to a broader aspect of the present invention, a power supply for multiple discharge lamps is provided, including a transformer having a primary winding and a secondary winding and configured to receive an input voltage through the primary winding and induce an output voltage across the secondary winding, and a current balance device coupled between the secondary winding and multiple discharge lamps for balancing the currents flowing through the discharge lamps. The current balance device includes a first inductor having a magnetic core with a plurality of legs and a plurality of windings each of which is wound on a leg, and a second inductor having a magnetic core with a plurality of legs and a plurality of windings each of which is wound on a leg. At least one winding of the first inductor and at least one winding of the second inductor are connected in series with each other and each serially-connected winding is coupled to a discharge lamp, and the other windings of the first inductor and the other windings of the second inductor are respectively coupled to a discharge lamp.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 2:
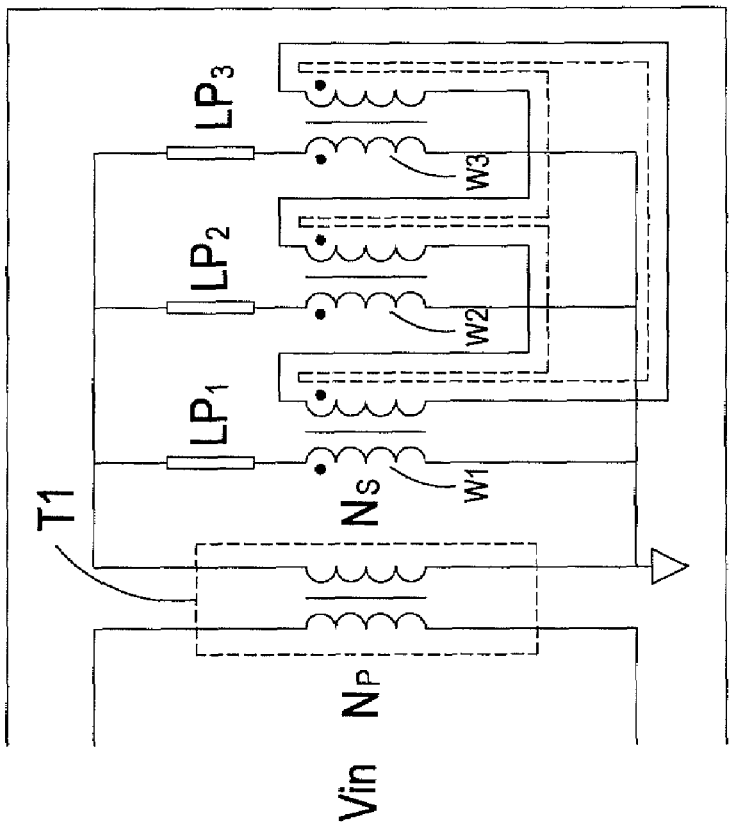
FIG. 2 shows a circuit block diagram of another conventional power supply for multiple discharge lamps and the current balance device thereof.
Figure 1:
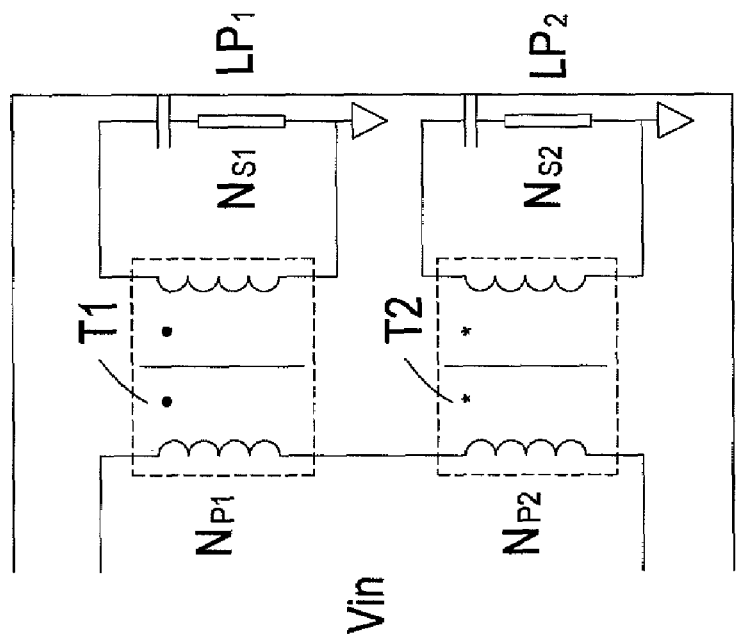
FIG. 1 shows a circuit block diagram of a conventional power supply for multiple discharge lamps and the current balance device thereof.
Figure 3:
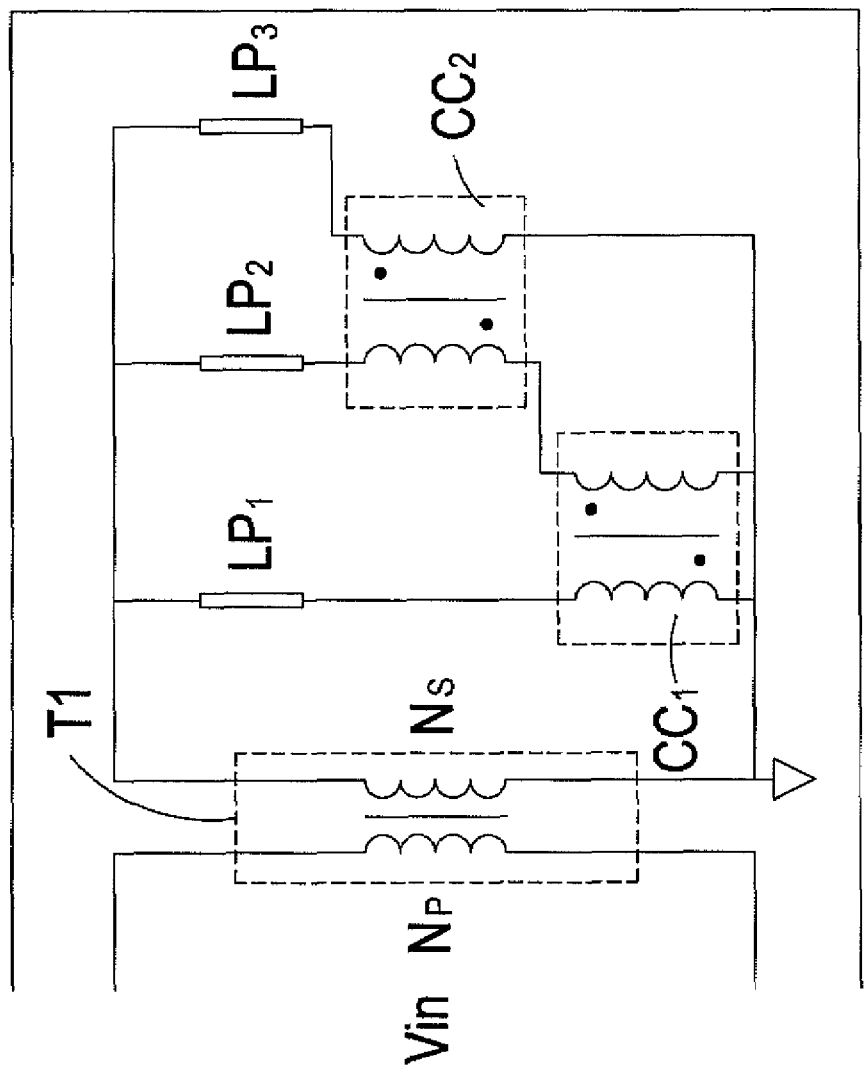
FIG. 3 shows a circuit block diagram of another conventional power supply for multiple discharge lamps and the current balance device thereof with common-mode chokes.
Figure 4:
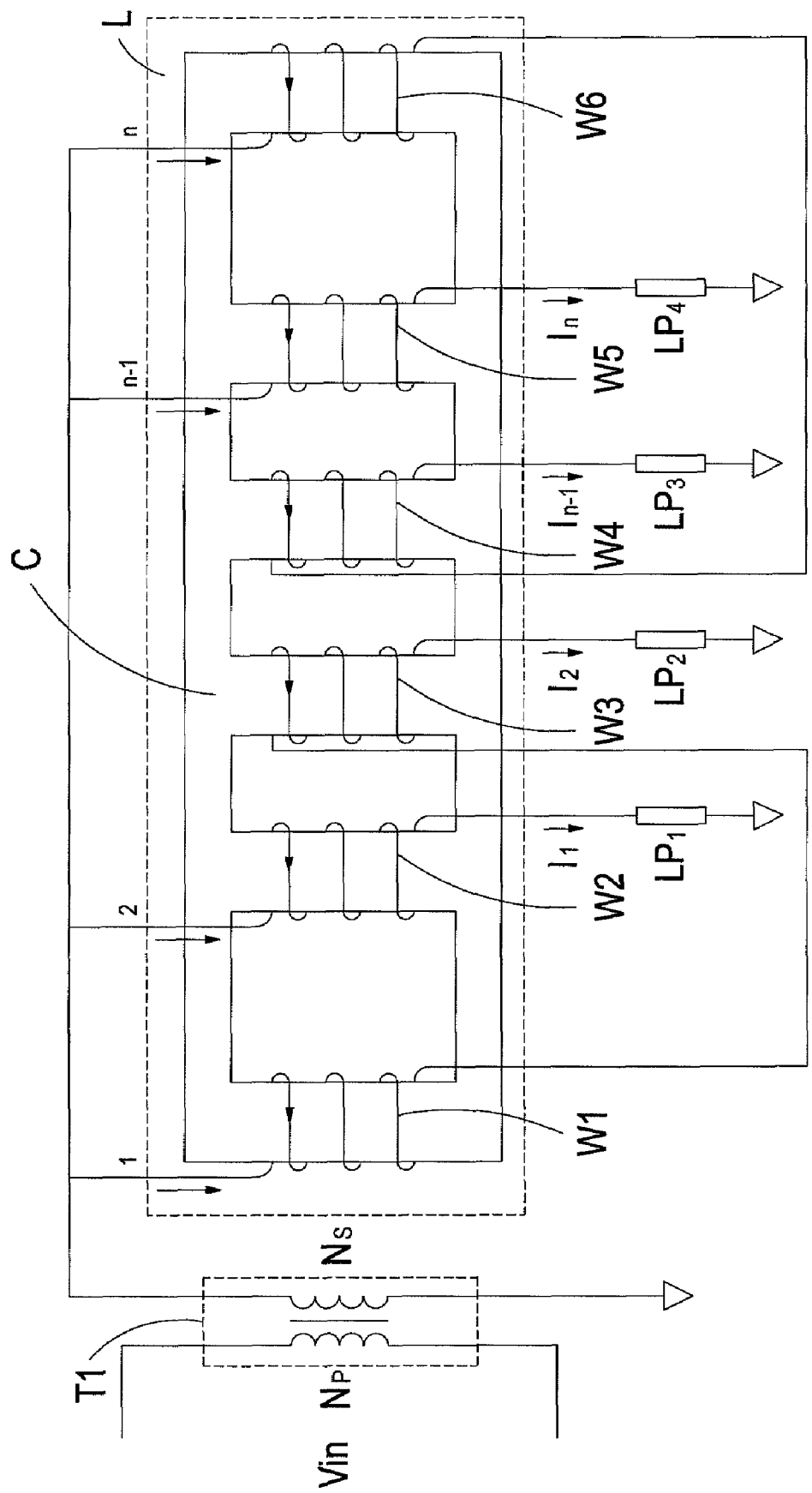
FIG. 4 shows a circuit block diagram of a power supply for multiple discharge lamps and the current balance device thereof according to a first preferred embodiment of the present invention.

A first embodiment of the inventive power supply for multiple discharge lamps is shown in FIG. 4. As shown in FIG. 4, a power supply for multiple discharge lamps is configured to drive multiple discharge lamps LP1-LP4. According to the first embodiment of the present invention, a power supply for discharge lamps includes a transformer T1 having a primary winding Np and a secondary winding Ns for receiving an AC voltage Vin through the primary winding Np and inducing a boosted high-frequency AC voltage across the secondary winding Ns to drive the discharge lamps LP1-LP4. The power supply of FIG. 4 further includes a current balance device coupled between the secondary winding Ns and the discharge lamps LP1-LP4 for balancing the currents flowing through the discharge lamps LP1-LP4. The current balance device includes a single inductor L having a magnetic core C with a plurality of legs, in which each leg can allow a winding to be wounded thereon and each winding has the same turn number, as shown in FIG. 4. According to the first embodiment of the present invention, the magnetic core C has six legs for accommodating six windings W1-W6, in which at least two windings thereof are connected in series with each other and each serially-connected winding is coupled to a discharge lamp. As shown in FIG. 4, an initial winding W1 is connected in series with an intermediate winding W3 and the serially-connected winding (W1+W3) is coupled to a discharge lamp LP2. An end winding W6 is connected in series with an intermediate winding W4 and the serially-connected winding (W6+W4) is coupled to a discharge lamp LP3, and the other windings W2 and W5 are respectively coupled to discharge lamps LP1 and LP4. With this configuration, the coupling relation between the initial winding W1 and the end winding W6 as well as the intermediate windings can be enhanced, and further the balance between the currents flowing through the discharge lamps LP1-LP4 can be improved. Also, it is to be noted that the number of legs within the inductor L is larger than three according to the present embodiment.

Figure 5:
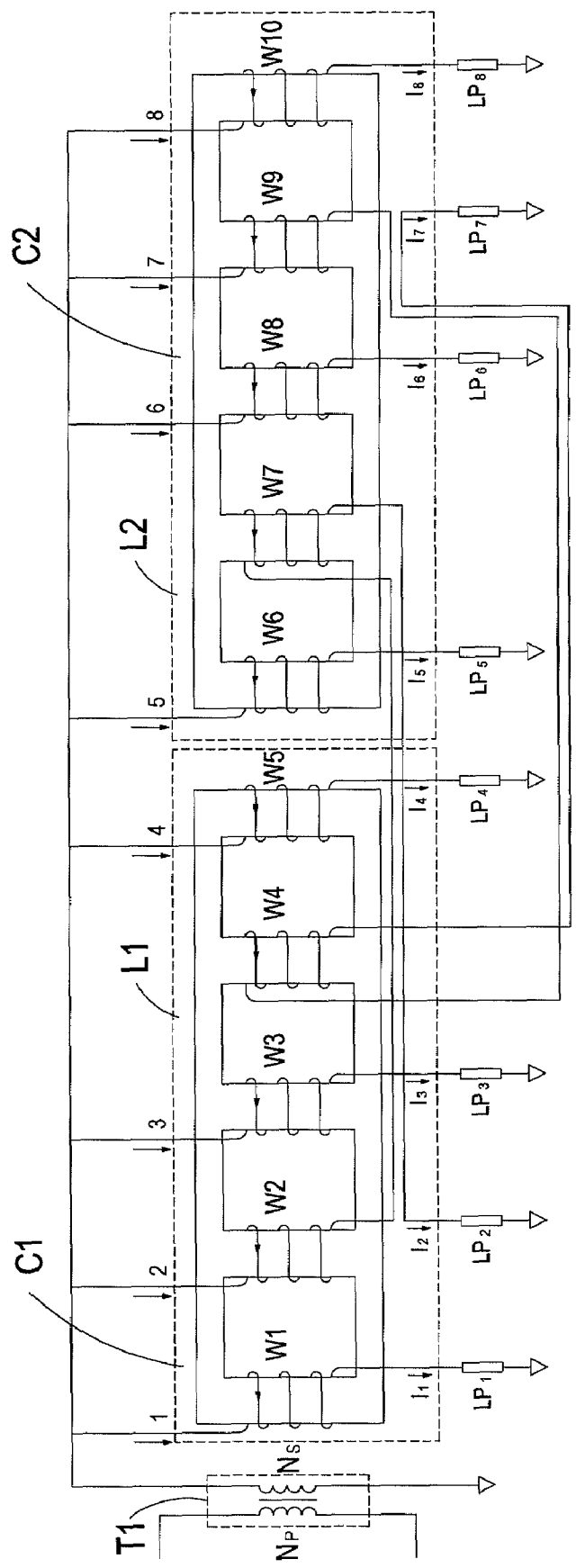
FIG. 5 shows a circuit block diagram of a power supply for multiple discharge lamps and the current balance device thereof according to a second preferred embodiment of the present invention.

A second embodiment of the inventive power supply for multiple discharge lamps is illustrated in FIG. 5. As shown in FIG. 5, a power supply for multiple discharge lamps is configured to drive a plurality of discharge lamps LP1-LP8. According to the second embodiment, a power supply for multiple discharge lamps includes a transformer T1 having a primary winding Np and a secondary winding Ns, in which the transformer T1 is configured to receive an AC voltage Vin through the primary winding Np and generate a boosted high-frequency AC voltage across the secondary winding for driving discharge lamps LP1-LP8. The power supply of FIG. 5 further includes a current balance device connected between the secondary winding Ns and discharge lamps LP1-LP8 for balancing the currents flowing through the discharge lamps LP1-LP8. The current balance device includes a first inductor L1 and a second inductor L2, in which the first inductor L1 has a magnetic core C1 with a plurality of legs and each leg allows a winding to be wound thereon, as shown in FIG. 5. Likewise, the second inductor L2 has a magnetic core C2 with a plurality of legs and each leg allows a winding to be wound thereon, as shown in FIG. 5. According to the second embodiment of the present invention, the magnetic core C1 has five legs and five windings W1-W5 respectively wound on a leg thereof, and the magnetic core C2 also has five legs and five windings W6-W10 respectively wound on a leg thereof, in which each winding of the first inductor L1 has the same turn number and each winding of the second inductor L2 has the same turn number. In FIG. 5, at least one winding of the first inductor L1 is connected in series with at least one winding of the second inductor L2 and each serially-connected winding is coupled to a discharge lamp, and the other windings of the first inductor L1 and the other windings of the second inductor L2 are respectively coupled to a discharge lamp. As shown in FIG. 5, the windings (W2, W4) of the first inductor L1 are respectively connected in series with the windings (W7, W9) of the second inductor L2 and the serially-connected windings (W2+W7, W4+W9) are respectively coupled to a discharge lamp (LP2, LP7). The other windings (W1, W3, W5) of the first inductor L1 and the other windings (W6, W8, W10) are respectively coupled to a discharge lamp (LP1, LP3, LP4, LP5, LP6, LP8). Therefore, the circuitry of current balance device for multiple discharge lamps can be designed in the form that windings allocated to different inductors are connected in series with each other to achieve the current balance effect in a multiple discharge lamp system. Also, it is to be noted that the number of legs within the each inductor is larger than three according to the present embodiment.

It is noteworthy that the current balance circuit can be placed between the discharge lamps and ground to achieve the same current balance effect for discharge lamps. Besides, the embodiment of FIG. 5 can be extended to the application where more than two inductors are employed to balance the currents flowing through the discharge lamps. In this case, each inductor has a magnetic core and a plurality of windings, and a portion of windings allocated to different inductors are connected in series with each other and each serially-connected winding is coupled to a discharge lamp, and the other windings are respectively coupled to a discharge lamp. Such circuit configuration should also fall into the scope as claimed by the present invention.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A power supply for multiple discharge lamps, comprising:
    a transformer; and
    a current balance device coupled between the transformer and a plurality of discharge lamps, wherein the current balance device comprises an inductor having a magnetic core with a plurality of legs and a plurality of windings and each leg has one winding wound thereon, wherein at least two of the plurality of windings are connected in series with each other and each serially-connected winding is coupled to a discharge lamp, and the other windings are respectively coupled to a discharge lamp.

2. The power supply for multiple discharge lamps according to claim 1 wherein the discharge lamp is a cold cathode fluorescent lamp.

3. The power supply for multiple discharge lamps according to claim 1 wherein an initial winding and an end winding of the plurality of windings are respectively connected with an intermediate winding.

4. The power supply for multiple discharge lamps according to claim 1 wherein each of the plurality of windings has the same turn number.

5. The power supply for multiple discharge lamps according to claim 1 wherein the transformer has a primary winding and a secondary winding and configured to receive an input voltage through the primary winding and induce an output voltage across the secondary winding.

6. The power supply for multiple discharge lamps according to claim 1 wherein the number of the legs within the inductor is larger than three.

7. A power supply for multiple discharge lamps, comprising:
    a transformer; and
    a current balance device coupled between the transformer and a plurality of discharge lamps, wherein the current balance device comprises:
    a first inductor having a magnetic core with a plurality of legs and a plurality of windings and each leg having one winding wound thereon; and
    a second inductor having a magnetic core with a plurality of legs and a plurality of windings and each leg having one winding wound thereon;
    wherein at least one winding of the first inductor and at least one winding of the second inductor are connected in series with each other and each serially-connected winding is coupled to a discharge lamp, and the other windings of the first inductor and the other windings of the second inductor are respectively coupled to a discharge lamp.

8. The power supply for multiple discharge lamps according to claim 7 wherein the discharge lamp is a cold cathode fluorescent lamp.

9. The power supply for multiple discharge lamps according to claim 7 wherein each winding of the first inductor has the same turn number, and each winding of the second inductor has the same turn number.

10. The power supply for multiple discharge lamps according to claim 7 wherein the transformer has a primary winding and a secondary winding and configured to receive an input voltage through the primary winding and induce an output voltage across the secondary winding.

11. The power supply for multiple discharge lamps according to claim 7 wherein the number of the legs within each inductor is larger than three.

12. A power supply for multiple discharge lamps including:
    a transformer; and
    a current balance device coupled between the transformer and a plurality of discharge lamps, wherein the current balance device comprises:
    a plurality of inductors, each of which has a magnetic core with a plurality of legs and a plurality of windings and each leg has one winding wound thereon;
    wherein a portion of windings allocated to different inductors are connected in series with each other and each serially-connected winding is coupled to a discharge lamp, and the other windings of the plurality of inductors are respectively coupled to a discharge lamp.

13. The power supply for multiple discharge lamps according to claim 12 wherein the number of inductors is equal to or larger than three.

14. The power supply for multiple discharge lamps according to claim 12 wherein each winding of the same inductor has the same turn number.

15. The power supply for multiple discharge lamps according to claim 12 wherein the transformer has a primary winding and a secondary winding and configured to receive an input voltage through the primary winding and induce an output voltage across the secondary winding.

16. The power supply for multiple discharge lamps according to claim 12 wherein the number of the legs within each inductor is larger than three.

* * * * *